(12) United States Patent
Bergmark et al.

(10) Patent No.: US 11,041,273 B2
(45) Date of Patent: Jun. 22, 2021

(54) METHOD OF PREPARING A SIZING BOOST ADDITIVE

(71) Applicant: SCA Forest Products AB, Sundsvall (SE)

(72) Inventors: Anette Bergmark, Sundsvall (SE); Birgitta Lindberg, Sundsvall (SE)

(73) Assignee: SCA FOREST PRODUCTS AB, Sundsvall (SE)

( * ) Notice: Subject to any disclaimer, the term of this patent is extended or adjusted under 35 U.S.C. 154(b) by 133 days.

(21) Appl. No.: 16/485,617

(22) PCT Filed: Mar. 15, 2017

(86) PCT No.: PCT/SE2017/050250
§ 371 (c)(1),
(2) Date: Aug. 13, 2019

(87) PCT Pub. No.: WO2018/169459
PCT Pub. Date: Sep. 20, 2018

(65) Prior Publication Data
US 2019/0382959 A1    Dec. 19, 2019

(51) Int. Cl.
| | | |
|---|---|---|
| *D21H 21/16* | (2006.01) |
| *D21C 11/00* | (2006.01) |
| *D21H 11/04* | (2006.01) |
| *D21H 17/23* | (2006.01) |
| *D21H 17/29* | (2006.01) |
| *D21H 17/33* | (2006.01) |
| *D21H 17/66* | (2006.01) |
| *D21H 23/04* | (2006.01) |

(52) U.S. Cl.
CPC ......... *D21H 21/16* (2013.01); *D21C 11/0007* (2013.01); *D21C 11/0021* (2013.01); *D21H 11/04* (2013.01); *D21H 17/23* (2013.01); *D21H 17/29* (2013.01); *D21H 17/33* (2013.01); *D21H 17/66* (2013.01); *D21H 23/04* (2013.01)

(58) Field of Classification Search
USPC ...................................................... 162/164.1
See application file for complete search history.

(56) References Cited

U.S. PATENT DOCUMENTS

| 4,517,052 A | 5/1985 | Choy |
| 5,338,406 A | 8/1994 | Smith |
| 2006/0254738 A1 | 11/2006 | Anderson et al. |
| 2010/0166968 A1 | 7/2010 | Doherty et al. |

FOREIGN PATENT DOCUMENTS

| CN | 102061642 A | 5/2011 |
| WO | WO-00/34583 A1 | 6/2000 |
| WO | WO-02/33172 A1 | 4/2002 |
| WO | WO-03/044274 A1 | 5/2003 |
| WO | WO-2004/088036 A1 | 10/2004 |
| WO | WO-2009/009821 A1 | 1/2009 |
| WO | WO-2017/029238 A2 | 2/2017 |

OTHER PUBLICATIONS

Stefan Antonsson et al., "Low $M_W$-lignin fractions together with vegetable oils as available oligomers for novel paper-coating applications as hydrophobic barrier," Science Direct; 2008, pp. 98-103, vol. 27.
Liying Dong et al., "The water resistance of corrugated paper improved by lipophilic extractives and lignin in APMP effluent," Journal of Wood Science, 2015, pp. 412-419, vol. 61.
Danupong Narapakdeesakul et al., "Novel use of oil palm empty fruit bunch's lignin derivatives for production of linerboard coating," Progress in Organic Coatings, 2013, pp. 999-1005, vol. 76.
Extended European search report issued in European patent application No. 17900917.0, dated Sep. 25, 2020.

*Primary Examiner* — Mark Halpern
(74) *Attorney, Agent, or Firm* — Faegre Drinker Biddle & Reath LLP

(57) ABSTRACT

A method of preparing a sizing boost additive, includes: I) combining a lignin oil and an aqueous solution of gelatinized cationic polysaccharide to obtain a lignin/polysaccharide blend, wherein the lignin oil is obtained by base catalyzed depolymerization of lignin; and the gelatinized cationic polysaccharide is prepared by cooking dry cationic polysaccharide in water until completely gelatinized; and wherein a weight ratio of lignin oil:polysaccharide in the blend is 1:0.5-2, where the weight of the polysaccharide is the weight of dry polysaccharide added in preparation of the aqueous solution of gelatinized cationic polysaccharide; and the combined weight of lignin and polysaccharide is 1-10 wt-% based on the total weight of the resulting blend; followed by II) mixing the lignin/polysaccharide blend at a temperature of 40-100° C., until the blend has changed color from grey-white to brown.

17 Claims, 4 Drawing Sheets

METHOD OF PREPARING A SIZING BOOST ADDITIVE

CROSS-REFERENCE TO PRIOR APPLICATION

This application is a § 371 National Stage Application of PCT International Application No. PCT/SE2017/050250 filed Mar. 15, 2017, which is incorporated herein in its entirety.

TECHNICAL FIELD

The present disclosure relates to a method of preparing a sizing boost additive, the sizing boost additive obtainable by the method, a method of producing hydrophobic paper, and a hydrophobic paper obtainable by such method.

BACKGROUND ART

Sizing agents, such as alkyl succinic anhydride (ASA) or alkyl ketene dimers (AKDs), are commonly used in the paper making industry as components in sizing dispersion formulations, for obtaining paper products with reduced tendency when dry to absorb liquid, and for improving printing properties. WO0233172A1 describes a sizing dispersant system comprising sodium lignosulfonate, which can be used to obtain water-repellant properties in the paper.

SUMMARY OF THE INVENTION

The present invention aims at providing a sizing boost additive which can contribute to reduced consumption of sizing agents in the production of hydrophobic paper products, and to improved properties in such paper products.

The present invention relates to a method of preparing a sizing boost additive, comprising the steps of I) combining a lignin oil and an aqueous solution of gelatinized cationic polysaccharide, and optionally water, to obtain a lignin/polysaccharide blend, wherein the lignin oil is obtained by base-catalyzed depolymerization of lignin; and the gelatinized cationic polysaccharide is prepared by cooking dry cationic polysaccharide in water until completely gelatinized; and wherein the lignin oil and the cationic polysaccharide are included in the lignin/polysaccharide blend so that a weight ratio of lignin oil:polysaccharide in the blend is 1:0.5-2, preferably 1:0.9-1.1, where the weight of the polysaccharide is the weight of dry polysaccharide added in preparation of the aqueous solution of gelatinized cationic polysaccharide; and the combined weight of lignin and polysaccharide is 1-10 wt-% based on the total weight of the resulting blend; followed by II) mixing the lignin/polysaccharide blend at a temperature of 40-100° C., preferably 90-95° C., until the blend has changed color from grey-white to brown.

The method may further comprise a step III) of filtering off any particles >0.5 mm, preferably followed by the step IV) of allowing the brown blend from step II) or filtrate from step III) to settle for 10-24 hours; and V) decanting and recovering the top phase. The decanted top phase is the sizing boost additive.

The lignin oil used in the above method is preferably obtained by base-catalyzed depolymerization of kraft black liquor, suitably by means of a method comprising the steps of a) preparing a black liquor composition comprising kraft black liquor, and having a hydroxide ion concentration of 1-40 g/l based on the volume of black liquor, if necessary adjusting the hydroxide ion concentration by means of an addition of an acidifying agent (AA1);

b) reacting the black liquor composition in a reactor (R) and reacting the black liquor composition at 180-240° C. for 10-120 minutes in the presence of a solid catalyst, thereby causing depolymerization of lignin in the black liquor;

c) cooling the composition to a temperature below the boiling point of a solvent to be added in a subsequent step;

d) acidifying the composition by adding one or more acidifying agents (AA2) until a pH of 4-5 is reached;

e) adding a solvent (S) to the composition, in order to extract oil phase from the composition;

f) separating the composition by phase separation in a first separation step (S1) into
  an oil phase (A) comprising solvent, oil, and organic acids,
  a first water phase (B) comprising water, salts, and non-depolymerized lignin solids,
  a second water phase (C1) comprising water and salts;

g) filtering (F2) the first phase (A) to remove any particles;

h) desalting the filtered oil phase (A) by
  washing it by adding water and separating by phase separation in a second separation step (S2) into
  an oil phase (D) comprising oil and solvent,
  a third water phase (C2) comprising salts; or
  adding adsorbent and/or absorbent material or ion exchange material, or combinations thereof.

i) evaporating (E2) the solvent comprised in the oil phase (D), thus obtaining the lignin oil.

The aqueous solution of gelatinized cationic polysaccharide added in step i) above is preferably obtained by cooking dry cationic starch in water until completely gelatinized, and adjusting the concentration to 0.5-23 wt-%, preferably 0.5-3 wt-%. The gelatinized polysaccharide is suitably allowed to cool to room temperature before combining it with lignin oil in step I).

The present invention also relates to a sizing boost additive, obtainable by the above-described method.

The present invention further relates to a method of producing hydrophobic paper, comprising a step of adding a sizing boost additive obtainable by the above-described method, and a hydrophobization agent, to a lignocellulosic pulp suspension at the wet end of a paper manufacturing process. The sizing boost additive is preferably added in an amount corresponding to 0.5-12 kg lignin oil per ton pulp, where the amount of lignin oil refers to the weight of lignin oil added in step I) of the method of preparing the sizing boost additive. The hydrophobization agent is suitably chosen from ASA, AKD, or AKD combined with resin. Also, PAC or Alum, and retention aids can advantageously be added to the pulp suspension. pH of the pulp suspension is preferably adjusted to 6-8.5, and the conductivity of the pulp suspension is preferably adjusted to 0-8000 µS/cm. The lignocellulosic pulp is preferably kraft pulp.

The present invention also relates to a hydrophobic paper obtainable by the described method.

DETAILED DESCRIPTION

The present disclosure relates to a method of preparing a sizing boost additive, which is useful in the manufacture of hydrophobic paper products.

In the production of paper products, it is generally desirable to decrease the consumption of chemicals, both for environmental and for economic reasons. The present disclosure describes a method, which uses a lignin oil, obtained by base-catalyzed depolymerization of lignin, as one of the starting materials. It has been found that the end product of the described method is useful as a sizing boost additive, and the use thereof in a sizing dispersion can reduce the necessary amounts of other sizing additives and improve the hydrophobic properties and UV stability of paper products.

Figure 1:
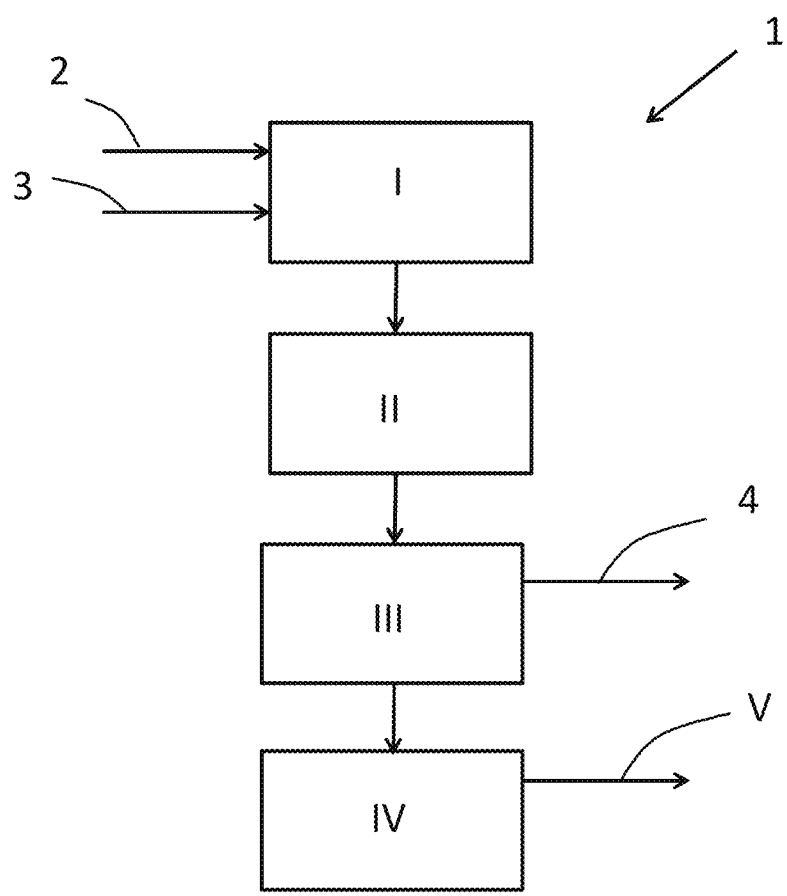
FIG. 1 shows schematically the method for preparing the sizing boost additive according to the invention.

The method (1) of preparing the sizing boost additive is schematically illustrated in FIG. 1, and comprises the steps of combining (I) a lignin oil (2) and an aqueous solution of gelatinized cationic polysaccharide (3), and optionally water, to obtain a lignin/polysaccharide blend. The lignin oil is obtained by base-catalyzed depolymerization of lignin, and is hereinafter referred to as the "lignin oil". A method suitable for obtaining the lignin oil is described in more detail below.

The aqueous solution of gelatinized cationic polysaccharide is prepared by cooking dry cationic polysaccharide in water until completely gelatinized. The term "dry polysaccharide" refers in this context a polysaccharide in powder form having a moisture content in equilibrium with ambient moisture. The cationic polysaccharide can be for example starch, dextrin, amylose or chitosan. Starch is preferred since it is well known as sizing additive, which is easily available, typically at a reasonable cost. When completely gelatinized, the concentration may suitably be adjusted to 0.5-23 wt-%, preferably 0.5-3 wt-%, based on the dry weight of added polysaccharide.

The gelatinized polysaccharide may suitably be allowed to cool to room temperature before combining it with lignin oil, whereby the concentration of polysaccharide in the aqueous solution of gelatinized cationic polysaccharide can be more easily adjusted to the desired value.

The lignin oil and the cationic polysaccharide are included in the lignin/polysaccharide blend so that a weight ratio of lignin oil:polysaccharide in the blend is 1:0.5-2, preferably 1:0.9-1.1, where the weight of the polysaccharide is the weight of dry polysaccharide added in preparation of the aqueous solution of gelatinized cationic polysaccharide. The combined weight of lignin and polysaccharide is 1-10 wt-% based on the total weight of the resulting blend, whereby the blend has sufficiently low viscosity, while avoiding unnecessary amounts of water. This blend has a grey-white color.

The lignin/polysaccharide blend is mixed (II) at a temperature of 40-100° C., until the blend has changed color from grey-white to brown. The heating during mixing is needed to convert the blend from grey-white to brown. By mixing at a temperature of 90-95° C. the conversion of the blend from grey-white to brown is faster.

After mixing, the lignin/polysaccharide blend, which is now brown, may be subjected to a filtration step (III), in which the blend is filtered to remove any particles (4) larger than 0.5 mm, in order to reduce the risk production problems in the subsequent paper making. Such particles may have a dark color, and the removal thereof decreases the risk of stains in a subsequently produced paper product and thus results in a more attractive paper product.

The method may further comprise a step (IV) of allowing the brown and optionally filtered blend to settle for a certain time, typically 10-24 hours; followed by decanting (V) and recovering the top phase. The top phase constitutes the sizing boost additive. By the settling and decanting, any inactive ballast can be removed from the additive, thus improving process economy. Alternatively, the blend can be centrifuged to remove any ballast.

The present invention also relates to a sizing boost additive, obtainable by the method described above. The properties of the lignin oil and the sizing boost additive are discussed in more detail below.

The sizing boost additive can be used in a method of producing hydrophobic paper. It has been found that the use of the sizing boost additive obtained as described above can substantially reduce the necessary amounts of other sizing additives such as ASA, AKD, etc., while reaching full sizing, and that the resulting hydrophobic paper product has improved UV stability.

The method of producing hydrophobic paper comprises the step of adding the sizing boost additive and a sizing agent to a lignocellulosic pulp suspension at the wet end of a paper manufacturing process. A suitable fiber concentration in the suspension is 0.1-2 wt-%, preferably 0.3-0.7 wt %. The sizing boost additive may be added in an amount corresponding to 0.5-20 kg lignin oil per ton pulp, preferably 3-12 kg lignin oil per ton pulp, where the amount of lignin oil refers to the weight of lignin oil added in the first step of the above-described method of preparing the sizing boost additive. The sizing agent is preferably chosen from alkyl succinic anhydride (ASA), alkyl ketene dimer (AKD), or AKD combined with resin, and poly-aluminum chloride (PAC) or Alum, and retention aids are added to the pulp suspension. The pH of the pulp suspension is preferably adjusted to 6-8.5, and the conductivity of the pulp suspension is suitably adjusted to 0-8000 µS/cm. The lignocellulosic pulp is suitably kraft pulp. The present invention also relates to a hydrophobic paper obtainable by the above-described method.

The lignin source used for obtaining the lignin oil is preferably kraft black liquor. The patent applications PCT/SE2015/050970 and PCT/SE2015/050969 describe methods, by means of which the lignin oil can be obtained. Lignin oil obtained using any of these processes contains no more than 1-3 wt-% ash. It has a sodium content of 1-50 ppm, a potassium content of 1-30 ppm, a sulfur content of 2-3 wt-%. The final lignin oil after the washing stage has as low salt content, typically less than 50 ppm, which allows further processing thereof. The viscosity of the lignin oil at a shear rate of 500 s$^{-1}$ and at 25° C. is in the range of 1000-3000 mPa s, especially in the range of 1600-2100 mPa s. Elemental analysis typically gives the following result:

| Element | Mass (%) |
|---------|----------|
| C       | 60-70    |
| H       | 5-7      |
| O       | 20-30    |

| Element | Mass (%) |
| --- | --- |
| S | 2-3 |
| N | 0.1-0.3 |

Figure 2:
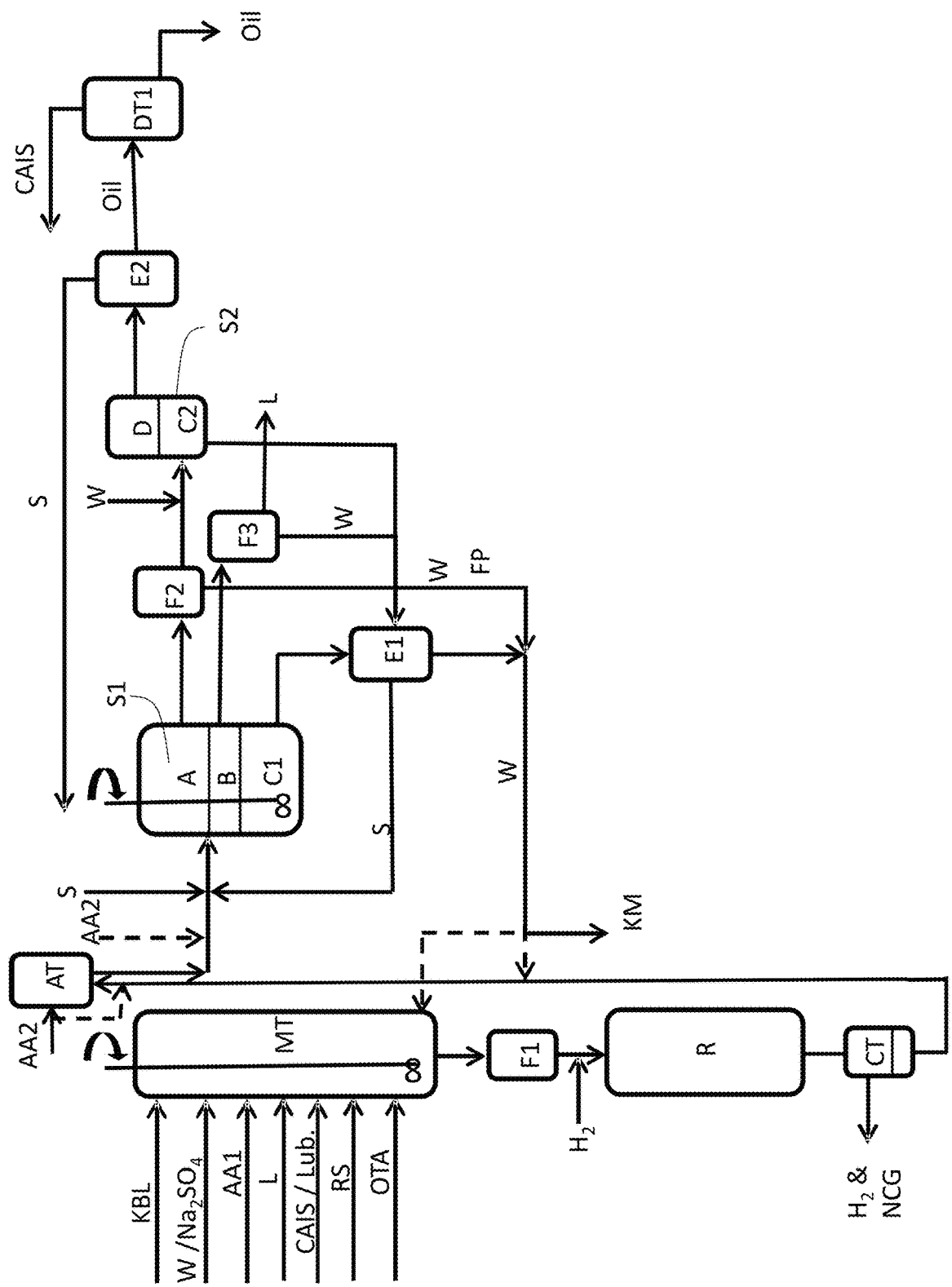
FIG. 2 shows schematically a method suitable for the production of the lignin oil used in the method of FIG. 1.

The production of lignin oil can be performed batch-wise or continuously. The process for obtaining the lignin oil described here is a batch process and comprises the steps of forming a black liquor composition, subjecting the black liquor composition to a depolymerizing reaction in a reactor. The method is schematically shown in FIG. 2. After the reaction, the resulting composition is subjected to cooling, and optional addition of salt and/or salt containing water. After that, acidifying agent is added, followed by addition of a solvent. The resulting composition is then phase separated into three phases, whereby the oil is contained in a solvent phase (A), and the water is separated into two salt containing water phases (B) and (C1), where (B) is a slurry phase comprising water, salts and precipitated non-depolymerized lignin, and (C1) comprises water salts. The separated lignin oil-containing phase (A) is subjected to filtering and desalting, and the solvent comprised in the oil phase is evaporated, to obtain the lignin oil. The evaporated solvent is optionally recycled to the process. The desalting step can be performed by water wash and separation in a second separation step into an oil-containing phase (D) and a water-containing phase (C2), or by adding adsorbent, absorbent, or ion exchange material. Each step will be described in more detail below. The process is preferably integrated with a kraft pulping process, whereby effluents and by-products from the production of lignin oil can be recycled to the kraft pulping process as desired.

In the process, a black liquor composition is formed in a mixing tank (MT) or in a batch reactor (R) by mixing kraft black liquor and acidifying agent, which is preferably any one of $CO_2$, $H_2S$, $SO_2$, sulfuric acid, or acidic process water having pH 1-3, or combinations thereof. The acidifying agent is added in an amount sufficient to adjust the hydroxide ion concentration of the black liquor to 1-40 g/l, preferably 5-15 g/l based on the volume of black liquor. The components of the black liquor composition can also be mixed in a separate mixing tank and then be introduced into the batch reactor.

The black liquor, which is fed to the process, typically has a solid content of 38-45% by weight. Any black liquor from the kraft pulping process can be used in the process, but the concentration of hydroxide ions ($OH^-$) may need to be adjusted. Different black liquors work similarly in the reactor stage, but have been found to behave differently in the acidification step. Therefore, the hydroxide ion concentration is an important parameter that needs to be adjusted prior to the reactor. For black liquors with high hydroxide ion concentrations, typically around 30 g/l, aggregation of hemicellulose is more pronounced and the amount of non-depolymerized lignin after acidification higher—both of which are undesired results. High hydroxide ion concentrations are characteristic of black liquors from low yield kraft pulping processes, i.e. processes producing pulps with high cellulose contents and low kappa numbers. In such processes, the presence of an anthraquinone (AQ) step in the pulping process leads to less hemicellulose in the black liquor and, consequently, to a lower degree of undesired hemicellulose aggregation in the subsequent lignin oil forming process. It has been found that when using black liquor having high initial hydroxide concentration and no addition of AQ in the pulping process some, but less, hemicellulose aggregation can still be seen at the subsequent acidification step (AA2) of the process, due to hemicellulose in the black liquor, even though the hydroxide ion concentration is adjusted from e.g. 30 g/l to 12 g/l. To address this aggregation, the hydroxide ion concentration of black liquors having high initial hydroxide ion concentration (i.e. low kappa pulp) should preferably be lowered to a greater extent, to a level of e.g. 6 g/l, to avoid aggregation during the subsequent acidification step.

It has been found that when using black liquor having a relatively low hydroxide ion concentration (i.e. high kappa pulp) of e.g. 12 g/l, obtained from a process without an AQ step, no substantial aggregation occurs in the acidification step subsequent to the depolymerization reaction of the process. If the kraft black liquor originally had a high hydroxide ion concentration (i.e. low kappa pulp), such as 30 g/l or more, the hydroxide ion concentration it may be advantageous to lower the $OH^-$ concentration to a lower level, such as 5-10 g/l, whereas a kraft black liquor initially having a lower hydroxide ion concentration, such as 12-15 g/l, the hydroxide ion concentration may not need to be adjusted.

Lignin powder can advantageously be added to the black liquor composition, preferably in an amount of 40-200 weight-% of the lignin content of the black liquor, more preferably in an amount of 50-100 weight-%. By adding lignin powder, the lignin oil throughput can increase, thus giving higher product volume, although the yield may decrease. An amount of 50-100 weight-% gives an improved lignin oil throughput, without leading to too low yield. The black liquor dissolves the added lignin powder. For example, by adding 100% lignin powder (based on lignin mass in the black liquor), the oil yield decreases ca 15%, but the total volume of oil produced will be larger. The lignin powder can originate from either softwood or hardwood. Different types of lignin powder are available, such as Lignoboost™ from Valmet, or Domtar's BioChoice™ lignin. Other alternatives are lignosulfonates from the sulfite pulping process, for example, Domsjo Fabriker and their trade name Domsjo Lignin and Borregaard in Norway have many trade names; for example Norlig, Borresperse, Borrement, Wafex and more. The lignin powder is preferably added directly to the black liquor composition in the mixing tank or in the reactor. The added lignin powder can be in moist or dry form. Alternatively, it can be dissolved in white liquor prior to addition to the black liquor composition. However, white liquor causes high amounts of $H_2S$ to be formed in the acidification process, which is undesirable.

The black liquor composition is preferably diluted with water prior to the reaction, to improve the yield of the reaction. The water is preferably mill water recycled from subsequent separation steps of an earlier batch, i.e. from one or more of the first water phase (B), the second water phase (C1), or the third water phase (C2), which are described in more detail below. The black liquor is preferably diluted by 25-100% based on the initial black liquor volume, and the recycled water preferably has a salt concentration of 5-30 weight-% based on the mass of water. The salts contained in the water contribute to a more effective phase separation in the subsequent oil and water separation step. Alternatively, salt can be added after the reactor, either in the form of salt containing water, or in the form of a particulate or as a saturated slurry. By adding the salt containing water after the reactor, the reactor volume can be reduced.

In case the black liquor composition was formed in a mixing tank, it is transferred to the reactor (R), optionally via a filtering step (F1). The reactor is preferably flushed with a gas that does not react with the components of the process to any substantial degree, such as nitrogen or carbon dioxide, to remove oxygen before start-up. Thereby, the risk of air oxidizing the black liquor in the process is minimized, and thus there will be less oxygen that has to be removed in subsequent processing steps. The reaction is performed at 220-350° C. for 10-120 minutes, preferably 30-60 minutes when no solid catalyst is used; or at 180-240° C. for 10-120 minutes, preferably 30-60 minutes, in the presence of a solid catalyst, in both cases causing depolymerization of lignin in the black liquor. In presence of solid catalyst hydrogen cleaves the carbon-oxygen bond in lignin to form water. Water formation (hydrogenolysis) leads to lower oxygen content in the resulting oil, which is positive for further processing of the oil. If catalyst is used in the reactor, the black liquor composition needs to be filtered before the reactor in order to remove any particles that could impede the catalyst and impair the reaction. A $H_2$ or $H_2/CO$ syngas pressure of 5-150 bar can preferably be applied to the reactor. The syngas should preferably comprise 5-95 weight % $H_2$. The hydrogen causes significant $H_2S$ formation without a solid catalyst leading to lower sulfur content in the resulting oil, which is positive for further processing of the oil, leading to a decrease in sulfur content in the final lignin oil of up to 50%.

In the reaction, a base cleaves ether bonds such as the β-O-4 ether bond in the lignin, resulting in a phenoxide RO— (where R is an aromatic ring) and an epoxide as suggested by Brendan D. Mar et al., J. Phys. Chem. A (2015), 119(24), 6551-6562, performing ab initio studies (computational chemistry) of lignin cleavage pathways. The cited work used a bulky tert-butoxide anion, which is a strong base but a weak nucleophile. The process utilizes OH— which is a strong base and a strong nucleophile. It is suggested that the β-O-4 cleavage and/or other bonds in lignin give phenoxide and carbonium ion not excluding alkoxide and arenium ion. The phenoxide or alkoxide is neutralized by a sodium counterion due to the excess of sodium whereas the carbonium or arenium ion is very reactive and prone to re-polymerize. The formation of carbonium ions in acid catalyzed depolymerization is well known, whereas it has not been described in base catalyzed depolymerization. This invention benefits greatly from adding a carbonium ion scavenger as shown by less re-polymerization and less coke resulting in a higher yield of lignin oil of lower viscosity which is easy to pump solvent free at room temperature. This supports the hypothesis of carbonium ion formation in base-catalyzed depolymerization. The figure below shows the β-O-4 ether bond in a small fragment of a large lignin molecule (*Ref Methods in Lignin Chemistry, Eds. S. Y. Lin and C. W. Dence,* 1992). The β carbon bonding to the oxygen is at position 4 of the aromatic ring. This is the most common ether bond that is cleaved, but there are more ether bonds in lignin, and the depolymerization of lignin is not trivial and not completely understood yet.

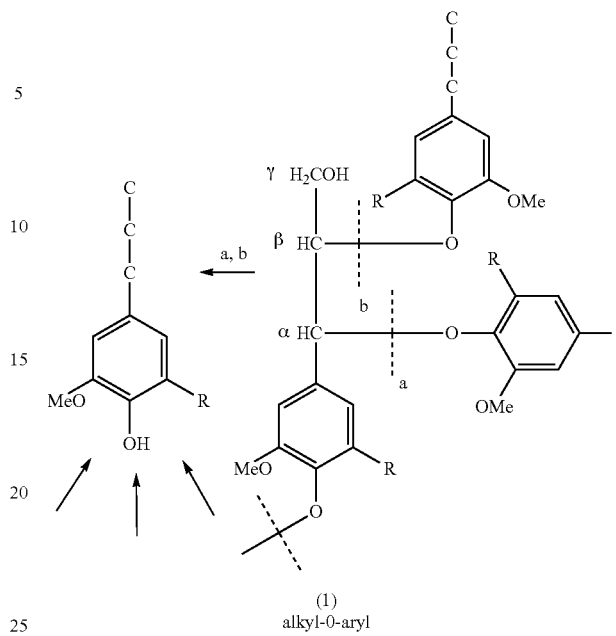

(1)
alkyl-O-aryl

The reaction is preferably preformed in the presence of a catalyst. A wide range of catalysts can be used, such as any noble metal on various support materials such as carbon, activated carbon, charcoal, graphene, carbon nanotubes, graphite, alumina, aluminum phosphate, zeolite, hydrotalcite, hydroxyapatite, magnesium oxide, zirconia, titanium dioxide, ceria, chromite, and molybdite. Other possible catalysts are transition metals such as V, Cr, Fe, Co, Ni, Cu, Zn, Zr, Nb, Mo and W on the same support material as above as well as transitions metals on metal-organic frameworks. Another option is NiO on the previously mentioned support materials, as well as unsupported metal particles such as transition metal, carbides, and nitrides. Further unsupported catalysts that may be suitable are Co—Mo—S, MoS2, VS2, Ni—Mo and Fe—Cu bimetallic catalysts.

The total acid number (TAN) depends on temperature and TAN decreases with increasing reaction temperature as decarboxylation of the organic acids may occur easier at a higher temperature. The difference is exemplified by comparing 200° C. with 220-240° C., where 200° C. gives a TAN on the order of 200 mg KOH/g oil and where 220-240° C. provide a TAN on the order of 100 mg KOH/g oil. Leaving out hydrogen slightly increases TAN.

To improve the process, additional additives can be added to the black liquor composition prior to reaction, such as carbonium and/or arenium ion scavengers, and/or lubricants, and/or radical scavengers, and/or oxygen atom transfer agents (OTA), or combinations thereof.

Carbonium and/or arenium ion scavengers (CAIS) are preferably any one of phenol, 2-naphtol, catechol, methyl catechol, thymol, anisole, guaiacol, cresol, toluene, o-, m-, p-xylene, and p-cymene, or combinations thereof. A carbonium or arenium ion scavenger is used as a scavenger for the carbonium or arenium ion that is created in ether bond cleavages, and it thus acts as an anti-repolymerization agent. When phenol or 2-naphthol are added, the hydroxyl group of the phenol or 2-naphthol donates electrons to the aromatic ring due to the resonance effect giving it a negatively charged character. This negatively charged aromatic ring creates a C—C bond with the carbonium or arenium ion hence preventing it from re-polymerization. Phenol can be added to the black liquor composition in a phenol:lignin ratio of 0.01-1:1, preferably 0.05-0.5:1 in order to avoid unnecessary excess of phenol, and most preferably 0.05-0.15:1, with an aim to obtain a right balance of anti-repolymerization and cost for the additive. It has been found that for a phenol:lignin ratio of 0.45-0.55:1, the resulting lignin oil does not smell of phenol, which indicates that no excess of phenol is present, whereas a phenol:lignin ratio of 1:1 leads to a strong smell of phenol, indicating excess phenol. An alternative CAIS is a mix of aromatic monomers from an extended water wash (which is described in more detail below), which is optionally integrated in the process, and is described in more detail below. The exact aromatic composition is not known, but GC-MS analysis of the oil indicates that the mix contains guaiacol, catechol and methyl catechol. Further, distillation or reactive distillation of the lignin oil resulting from the process gives aromatic monomers, such as catechol, which can be added to the black liquor composition as CAIS. The reduction product of anthraquinone in the pulping process, 9,10-dihydroxyanthracene, may also be used as CAIS. $OH^-$ is a catalyst in this reaction but it is consumed by organic acids such as formic and acetic acid as they are formed by the alkaline degradation of hemicellulose. The lubricant is preferably any one of toluene, o-, m-, p-xylene, p-cymene, gasoline, and diesel, or combinations thereof. Lubricants sustain a clean reactor surface as well as giving the final crude oil a lower viscosity.

The oxygen atom transfer agent (OTA) is preferably any one of anthraquinone, flavone-derived tannins, tannins with flavonoid units containing a carbonyl carbon, menadione, and quercetin, or combinations thereof. As mentioned above catalytic amounts of anthraquinone can be added to the kraft pulping process to protect the hemicellulose from alkaline degradation, thereby increasing the pulp yield. This is explained in Handbook of Pulp (editor Herbert Sixta), and illustrated in the figure below.

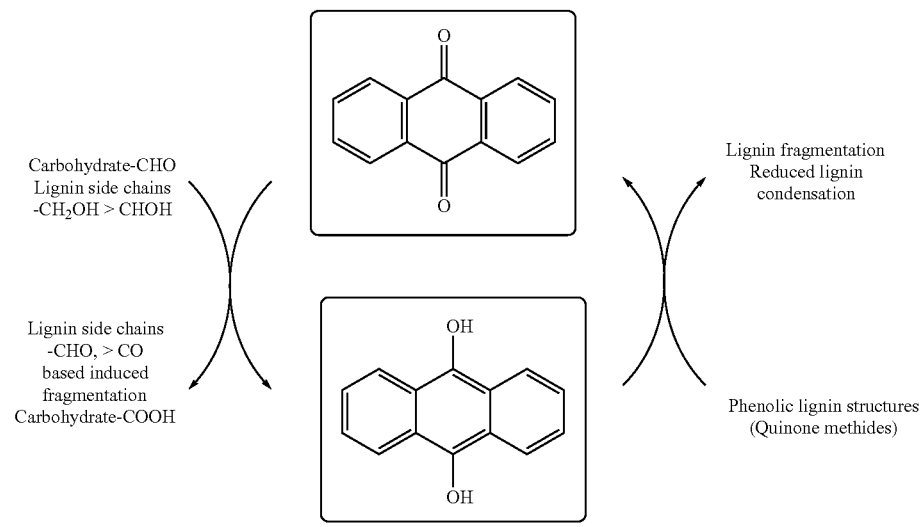 [SMILES: O=C1c2ccccc2C(=O)c2ccccc21 ; Oc1c2ccccc2c(O)c2ccccc12]

The anthraquinone is first reduced to alcohol (9,10-dihydroxyanthracene) and then oxidized back to anthraquinone. By this redox process, the aldehydes of the hemicellulose (carbohydrate-CHO) are oxidized to carboxylic acids which are more stable against alkali degradation. At the same time, lignin is reduced.

By adding anthraquinone or another OTA to the black liquor in the process another mechanism may occur. Adding an OTA leads to that oxygen is transferred from lignin to hemicellulose, and in doing so the aldehydes of the hemicellulose are oxidized to more stable carboxylic acids. The carboxylic acids can be separated by distillation, leading to a lignin oil containing less oxygen. As the figure below shows, the lignin is cleaved by OH⁻ giving the alkoxide or phenoxide RO⁻ (Ref. Z. Zhu and J. Zhu, Fuel (2015) 148, 226-230). The alkoxide or phenoxide is a strong base which attacks a carbonyl carbon in anthraquinone leading to a negative charge on one oxygen. This electron pair creates a dioxirane, i.e. the functional group containing 2 oxygens in a triangle which is shown to the bottom right in the figure. Simultaneously, an R⁻ is released. This ion is protonated by water, returning the OH⁻ catalyst. The dioxirane is a suitable oxidant that is able to oxidize the aldehydes and even secondary alcohols of hemicellulose, hindering alkali degradation of hemicellulose.

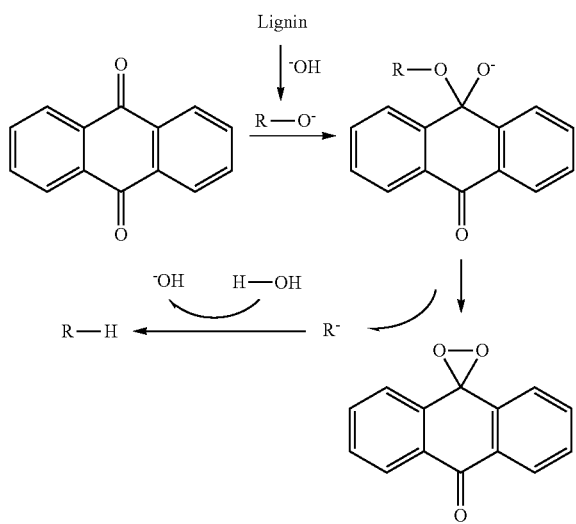

Even with addition of anthraquinone the final product contains some organic acids, since the lignin itself may create organic acids during the depolymerization. Organic acids formed from lignin explain why the OH⁻ concentration is lower after the reactor stage as the acids are consumed by OH⁻.

A significant advantage of anthraquinone is that when added to high alkali black liquor (i.e. low kappa pulp), having an OH⁻ concentration of typically 30 g/l or more, it reduces the aggregation of hemicellulose and non-depolymerized lignin which are more pronounced at low kappa pulp. The residual OH⁻ concentration after the reactor stage will typically be lower without the addition of anthraquinone, as compared to the addition of anthraquinone. This indicates that the hemicellulose is protected by anthraquinone and that less organic acids are created, as less OH⁻ is consumed.

The addition of anthraquinone before the reaction may be an alternative to the reduction of the OH⁻ concentration, mentioned above. Thereby aggregation of hemicellulose can be avoided, and at the same time, an oil of lower TAN (total acid number) and lower oxygen content can be obtained. Anthraquinone is preferably added in an amount of 1.75 wt-% of the lignin content. When anthraquinone is used in the kraft pulping process, the dosage is typically 0.05-0.15 wt-% of wood.

The radical scavengers are preferably stilbenoids, such as piceatannol, methyl piceatannol or resveratrol, or combinations thereof. Radicals may be formed during the depolymerization, and radical scavengers serve to hinder radical re-polymerization.

As mentioned above, salts can be added either to the black liquor composition together with water prior to depolymerization reaction, or they can be added after the reactor in the form of particulate salt, preferably $Na_2SO_4$ and/or electric filter ash, or in the form of water of one or more of the first water phase (B), the second water phase (C1), and the third water phase (C2). The presence of salt contributes to an accelerated and improved separation of solvent and water in the subsequent phase separation step. The reasons for that are the larger density difference between the solvent and the water phase, and also the decreased solubility of the solvent and lignin oil in highly salted water.

In the start-up of a series of batch processes, an aqueous solution of 20 wt-% $Na_2SO_4$ is added in a volume of 25-100% of the black liquor volume. This addition of $Na_2SO_4$ is only needed at start-up. When the next batch is diluted with recycled water from subsequent phase separation, a steady-state of sufficient salt concentration is reached already after one cycle, so that a good separation between water phase (C) and slurry phase (B), as well as a good separation of (A) from (B) is obtained.

The water contained in the reaction blend prior to the phase separation preferably has a salt concentration of 5-30 weight-% based on the weight of water, more preferably 15-20 weight-% based on the weight of water present after the reaction. The salt can also be added in the form of electric filter ash from the kraft mill recovery boiler, which is advantageous, as mills normally have a surplus of electric filter ash. Electric filter ash typically has the following composition (weight-%): 0.6 chlorine, 29.9 sodium, 4.0 potassium, 4.9 carbonate, balance (100-chlorine-sodium-potassium-carbonate) 60.6 sulfate, and traces (<100 ppm) of Al, Si, Fe, Mg, Ca, Mn, P, B, Ba, Cu, and Zn. Even if additional salt is not added, the water phase will still contain salts originating from the black liquor, but to a lower extent.

After the depolymerization reaction, the composition is cooled to a temperature below the boiling point of a solvent which is added in the subsequent extraction step. The cooling may be performed in a separate cooling tank, or in a cooled acidification tank, or by means of heat exchangers. Before the cooling step the composition may be led through a condenser step, in which $H_2$ and other non-condensable gases are separated off, and wherein the composition is cooled to some degree.

After cooling of the reaction composition, it is acidified by adding one or more acidifying agents (AA2) until a pH of 4-5 is reached. The acidifying agents can be any of $CO_2$, $H_2S$, $SO_2$, sulfuric acid, or acidic process water having pH 1-3, or combinations thereof, and are preferably added successively during a period of 45-60 minutes. By acidifying the composition, alkoxides and phenoxides in the composition become protonated so that the oil can be extracted to the solvent phase without the sodium counter-ion, and non-depolymerized lignin is precipitated.

A solvent (S) is added to the acidified composition, in order to extract oil from the composition. The lignin oil resulting from the depolymerization reaction is polar and aromatic and is soluble in a polar solvent or an aromatic solvent. The solvent added has to be non-miscible with water. The solvent should have a lower density than the salt containing process water, preferably 0.8-1.1 g/cm$^3$. Suitable solvents are polar or aromatic solvents, such as ethyl acetate, methyl isobutyl ketone (MIBK), methyl-tetrahydrofuran, toluene, benzene, benzyl alcohol, phenyl ethyl alcohol, 3-phenyl-1-propanol, anisole, o-, m-, p-xylene, and p-cymene, or combinations thereof. Polar solvents are preferred, since they often have lower boiling temperature than aromatic solvents, which gives a more economic process. Many organic compounds in the lignin oil have a high affinity to and are soluble in ethyl acetate, which can give a high yield, despite some losses of water-soluble monomers to the water phase. The preferred polar solvent ethyl acetate preferably has a temperature of above 20° C. and below its boiling point of approx. 77° C., preferably 20-50° C., in order to give an improved separation of solvent (A) and water (B, C1), and is preferably added in excess of the mass of lignin oil contained in composition. The preferred aromatic solvents toluene and benzyl alcohol preferably has a temperature of 50-100° C. A higher solvent temperature may improve separation due to more rapid diffusion of the substances to be separated and decreases the risk of salt precipitation, which could occur at lower temperatures. Advantages with ethyl acetate and methyl-tetrahydrofuran are that they can be produced sustainably from non-fossil sources. Ethyl acetate is a common solvent that is considered relatively harmless, and also has a relatively low boiling point (77° C.) which saves energy in evaporation and power of solvent recovery.

The composition comprising lignin oil, solvent, precipitated non-depolymerized lignin, water and salts is subjected to separation in a first separation step (S1), which takes place in a separation tank wherein it is left to separate by means of phase separation into an oil phase (A) comprising solvent, oil, and organic acids; a first water phase (B) comprising water, salts and non-depolymerized lignin solids; and a second water phase (C1) containing water and salts. The separated phases are withdrawn separately from the separation tank. As described above, salts present in the composition contribute to improved phase separation, since the salts are soluble in water and increase the density of the water phase. The first water phase (B) is a slurry phase comprising the precipitated non-depolymerized lignin. The relative volumes of phases B and C1 are dependent on the temperature in the reactor: phase (B) increases in volume with increasing reactor temperature since the lignin becomes more porous.

The phase separation is preferably initiated by agitation at 1-10 rpm, preferably 4-5 rpm for 5-30 seconds, and allowed to proceed without agitation for 15-30 minutes. The very brief agitation kick-starts separation of the aqueous phase into two phases (B) and (C1). It is believed that the swirl may induce a wave upwards which pushes the solid particles upwards and at the same time causes a stable density difference between (B) and (C1). The separation can alternatively be performed with continuous slow stirring at 1-10 rpm, preferably 4-5 rpm. The separation can be performed without agitation, but the time needed will be much longer, up to 90-120 minutes.

In addition to the solvent, oil, and organic acids, the phase (A) may contain minor amounts of water, since water is soluble to a small extent in the solvent and minor amounts of carbon particles. The separated phases (B) and (C1) may contain minor amounts of solvent since the solvent is soluble to a small extent in water. This solvent is recovered by evaporation. The water phase (C1) may also contain water-soluble monomers and organic acids. The oil and solvent phase (A), separated in the first separation step (S1), is led through a filtration step (F2), to remove any fine particles that may be present therein. Particles present in this phase are likely to have a density similar to that of this phase. The fine particles separated in the filtration step may be recovered and returned to the process, e.g. by adding them together with any wash water from the filter (F2) to the water phase that comes out of the evaporator (E1). The fine particulate contained in this combined water flow corresponds to less than 1% of the lignin present in the black liquor composition.

The filtered first phase (A) is then desalted by water wash, or by the addition of adsorbent and/or absorbent material or ion exchange material. In the water wash, water is added to the oil and solvent phase (A), preferably in excess of the volume water present in the solvent/oil. Most of the salts present in the oil are then transferred to the water phase, and the oil/solvent/water blend is allowed to separate by means of phase separation in a second separation step (S2) into an oil phase (D) comprising oil and solvent, and a third water phase (C2) comprising the salts. The added water may be deionized water, or mill water from the kraft pulp mill, or may be recycled from the separation step (S2). Mill water may contain hemicellulose, possibly leading to a need for adjustment of the OH$^-$-concentration or to a need for the addition of anthraquinone in the black liquor composition. Water wash is a method of desalting preferred in batch-wise production of lignin oil since it gives a less complicated process.

Desalting of the oil/solvent phase can also be obtained by letting the oil/solvent pass through a bed of adsorbent and/or absorbent material or ion exchange material, or combinations thereof. The adsorbent and/or absorbent material or ion exchange material can be regenerated on site with various methods, which are known in the art. After desalting, the oil/solvent phase (D) is led to an evaporation step (E2), in which the solvent comprised in the oil/solvent phase is evaporated, and a substantially solvent free lignin oil phase is obtained. The solvent may be recycled to the step of addition of solvent before the first separation step in a subsequent batch. If desired, all solvent need not be evaporated but can remain in the lignin oil to some extent, to make the oil easy to pump. The final lignin oil preferably has as low salt content as possible, preferably less than 10 ppm, in order to allow further processing.

Even if the phase separation in the first and second phase separation steps is efficient, small amounts of solvent remain in the water phase due to solvent solubility in water. One or more of the water phases from the first and second phase separation steps, i.e. the first water phase (B), the second water phase (C1) and the third water phase (C2), are therefore preferably led to an evaporation step (E1), in which any solvent comprised in the water is evaporated, and can be recycled in a subsequent batch. The evaporator of this step (E1) is larger than the one used for evaporation of the solvent (E2) since it takes streams from the water phase coming from the filtration of non-depolymerized lignin and water from the water wash. The water phase that comes out from this larger evaporator (E1) may contain fine particulates that correspond to less than 1% of the lignin present in the black liquor composition.

EXAMPLES

Experiments were performed, in which a sizing boost additive according to the present invention was prepared in laboratory scale using lignin oil obtained by base-catalyzed depolymerization reaction as one of the ingredients, and its effect as an additive in the preparation of hydrophobic paper was tested. Comparative results were achieved by preparing an additive using the same procedure, but replacing the lignin oil with three different types of commercial lignin:

Lignoboost (LB), which is a kraft lignin from the sulfate process, extracted with a specific technique under the trade name Lignoboost;

Lignosulphonate (LS), which is a biopolymer; a lignosulfonate is a sodium salt of lignosulfonic acid that has been formed when pulp is manufactured by the sulfite method;

Hydrolysis lignin (HL), which is lignin residues from an acid (or enzymatic) hydrolysis process of biomass. Hydrolysis lignin has high sorption ability.

1. Production of Lignin Oil

The lignin oil used in the experiment was obtained by the following method:

a) The starting material was black liquor with a typical dry solid content of 46.9%, density of 1247 g/l and a residual alkali of 13 g/l. The total lignin content of 214 g/l corresponded to 181.1 g/l Klason lignin and 33 g/l acid soluble lignin. The carbohydrates content was represented by 1.1 g/l galactose, 0.64 g/l arabinose and 0.88 g/l xylose with a total hemicellulose content of about 2.6 g/l;

b) The lignin depolymerization was carried out in a 2L Parr pressure reactor operating at 230° C. with a residence time of 2 h. The black liquor loading was 1 kg. A small amount of phenol was added as a capping agent into the process (amount of phenol: 10% of the Klason lignin content in the black liquor), to avoid re-polymerization into char and coke of unstable carbonium and arenium ions formed during the depolymerization. The reaction was quenched by placing the reactor in cold water and letting out the gaseous products at 50° C. Also, the reactor was flushed with nitrogen prior all experiments leaving no oxygen inside;

c) After the base-catalyzed depolymerization reaction, the solution was slowly acidified with concentrated sulfuric acid (95% concentration, the speed of acidification: 1.4 ml/min) during relatively high magnetic stirring, lowering the pH to 4.5, causing non-depolymerized lignin to precipitate. Foaming is controlled by the speed of stirring;

d) 2L of ethyl acetate was added as a solvent (S) to the composition, to extract oil (organic phase);

e) The organic phase also contains impurities such as salts or metals which are part of the oil as the oil contain 0.5-1 wt-% water after recovering the solvent. With water comes salt so prior solvent recovery the organic phase is desalted by a water wash (ratio 1:1 organic phase: water);

f) The organic phase was decanted off and filtrated through a filter paper to remove a minor amount of microparticles present. The solvent recovery of ethyl acetate (b.p. 77° C.) was executed by a rotary evaporator at 65 mbar vacuum and a water bath temperature of 30° C. This method of solvent recovery means that organic acids (b.p. 101° C. and higher) are included in the lignin oil;

g) The lignin oil is obtained.

2. Analysis of Lignin Oil

The lignin oil thus obtained was analyzed, with the following results.

2.1 Elemental Analysis

Elemental analysis (CHNO) was performed using the method ASTM D 5291 and for Sulfur analysis (S) the method ASTM D 1552 A, with the following result: C 60-70 wt-%; H 5-7 wt-%; O 20-30 wt-%; S 2-3 wt-%; N 0.1-0.3 wt-%.

2.2 Ash/Metals

Metal content was determined by ICP (Inductively coupled plasma) technology. The instrument used was an iCAP 6000 series from Thermo Scientific with an ASX-520 autosampler.

The sample preparation method was the following: 0.2 g of lignin oil dry sample was added to a vial and water was added to a total volume of 10 ml. This vial was slowly loaded with 2 ml $H_2O_2$ and left to react for 10 minutes. After this reaction 1 ml concentrated $HNO_3$ was added. The sample was heated in a microwave (800 W) for 2 h to reach a temperature of 175° C. The pressure was 55 bar. The residence time at 175° C. was 20 minutes. After this procedure, the sample was loaded into the ICP device.

The process according to claim, wherein said substantially lignin oil contains no more than 2-3 percent ash. A sodium content of 1-50 ppm, a potassium content of 1-30 ppm, a sulfur content of 2-3 wt-%. The final lignin oil after washing stage preferably has as low salt content as possible, preferably less than 50 ppm, in order to allow further processing.

2.3 Viscosity

Viscosity is a measure of the resistance of the liquid to flow. The viscosity of standard fuel is typically measured as kinematic viscosity according to ASTM D 445. The viscosity of the lignin oil at a shear rate 500 $s^{-1}$ and at 25° C. was measured according to ASTM D 445, and was found to be in the range of 1000-3000 mPa s, especially in the range of 1600-2100 mPa s.

2.4 Molecular Weight of Lignin

GPC (Gel Permeation Chromatography, sometimes called SEC, size exclusion chromatography) was used to measure weight average molecular weight of the oil. The oil was dissolved in tetrahydrofuran prior measurements. The GPC instrument was a Perkin-Elmer device with a refractive index based detector and columns from Polymer Lab. The measured average weight molecular weight of the lignin oil was 600-700 g/mol. The lignin oil is suitably constituted of an average weight molecular weight of 100-1000 g/mol with a polydispersity of 2 for the purposes of the present invention.

2.5 pH

The pH of lignin oil is in the range of pH 4-7.

2.6 Product components in the lignin oil analyzed by GC-MS

The product components were analyzed by GC-MS (gas chromatography coupled to a mass spectrometer). The GS-MS instrument hardware and settings are shown below:

Instrument: ISQ Trace GC Ultra AS Triplus, Thermo Scientific

Column ZB-5MSi: 30 m, 0.25 mm id, 0.25 µm film thickness

Carrier: He, 1.0 ml/min constant flow

Injector temperature: 260° C.

Oven program: 40° C. 1 min hold time, ramp 1: 5°/min 40-250° C., ramp 2: 20°/min 250-300° C.

Transfer line 240° C.

Ion source 250° C.

The internal standard used was 2,6-diethylnaphtalene.

The sample preparation method was the following:

2 mg oil was dissolved in 3 ml acetone (GC quality), and 1 ml of this solution was transferred to a vial. The solvent from vial was evaporated, and 50 μl of internal standard were added and then evaporated again. The concentration of the internal standard was 1 mg/ml.

The sample was derivatized by adding 100 μl of BSTFA and 100 μl of dry acetone to the vial. The closed vial was heated in an oven for 25 minutes at 70° C.

In the case of no derivatization 200 μl, dry acetone was added to keep the same procedure.

The lignin oil product obtained by the above process was found to comprise phenol, o-cresol, p-cresol, m-cresol, guaiacol, catechol, 4-methylcatechol, syringol, acetovanillone, syringaldehyde, 3-5-dimethoxy-4-hydroxyacetophenone, 4-hydroxy-3-methoxyphenylacetone, 2-hydroxypropanoic acid, hydroxyisobutyric acid, hydroxyacetic acid, 2-hydroxybutanoic acid, 4-hydroxypentenoic acid, 2-hydroxypentanoic acid and phenylacetic acid.

The GC-MS fraction listed above corresponds to light volatiles (low molecular weight) components.

2.7 TAN (Total Acid Number)

The total acid number (TAN) depends on temperature and TAN decreases with increasing reaction temperature as decarboxylation of the organic acids may occur easier at a higher temperature. TAN is measured by titration and expressed as mg KOH/g oil and was measured according to ISO 660 standard. Total acid number in the lignin oil was 80-150 mg KOH/g oil.

2.8 Water Content

Water content of the lignin oil wwa determined by Karl Fischer (KF) titration method using 3:1 methanol:chloroform as a solvent. The lignin oil has a water content of 0.1-1.5 wt-%.

2.9 Lignin Content

The lignin oil can be represented by a complex of compounds: organic acids, monophenols such as phenol, p-methylguaiacol, p-ethylphenol, and vanillin derived from lignin depolymerization which represents 85-98% of the oil composition.

2.10 Heating Value

Calorimetric heat value, elemental analysis (C,H,N,S) and calculated net heat value of the process water slurry was determined by the EN14918/15400/ISO1928 standard method. The sample was homogenized, and a bomb calorimeter was used to determine heat value. Sulfur was determined by ion chromatography on a sample utilized in the bomb calorimeter. The lignin oil has a heating value of 25-35 MJ/kg.

3. Comparison of Lignin Oil with Hydrolysis Lignin, Lignoboost, and Lignosulfonate Lignin The chemical reactivity of technical lignins is a keystone of many applications. Due to their heterogeneous structure, lignins often show unexpected behavior. As technical lignins, such as hydrolysis lignin, lignoboost, and lignosulfonate lignin, contain different functional groups, they can react in diverse ways. Thus, the reactivity of lignin and its structure are closely related.

The reactivity of the lignin is limited because of the small number of ortho and para reactive sites and their poor accessibility (Vishtal and Kraslawski 2011; Challenges of lignins, bioresources 6(3), 3547-3568). The chemical nature and content of such oxygen-containing functional groups as carboxy-, keto- and aldo- are of crucial importance for the reactivity of lignin oil solutions. Decreasing the molecular weight by oxidative and other methods, modifying the structure in order to increase the amount of particular functional group or isolating lignin fragments with a specified Mw and structure are examples of methods for enhancing reactivity.

The lignin oil used in the present experiment followed a depolymerization of lignin to oligomers and monomers which improved the accessibility of reactive sites. The combination of depolymerization with a phenolation reaction using phenol as a capping agent produced depolymerized lignin oil solutions that contain a large fraction of low molecular weight compounds with acidic functionalities, resulting from both lignin and polysaccharide degradation reactions. These solutions are characterized with enhanced reactivity as compared to technical lignins (it is demonstrated in section 5).

Several phenomena can explain the high dimensional stability imparted by the lignin oil in the case of the starch-lignin blended system: the miscibility and reactivity of low-molecular weight compounds of oil with starch, the hydrophobic nature of lignin oil and the possible existence of cross-linkages formed through phenolic compounds. Thus, starch/lignin materials not only provide model systems to investigate the interaction lignin oil compounds and polysaccharides, but they also present technical advantages that offer perspectives for utilization in the field of packaging or mulching.

The tables below shows parameters and properties of the lignins used in the described tests below.

| Properties of Lignin oil | |
|---|---|
| Parameters | Characteristics (Values) |
| Lignin oil | Obtained as described above |
| Physical state | Oily |
| Color | Dark brown to black |
| pH | 4-7 |
| Solubility | Not soluble in water or under acidic and neutral conditions. Soluble in polar solvent or polar aromatic solvent. |
| Content in fuel (mass-%) | |
| Moisture | 0.1-1.5% |
| Ash (dry) | 0.1-3% |
| Heat Value (MJ/Kg) | |
| HHV | 25.0-35.0 |
| Elemental analysis (mass-%) | |
| C | 64.1 |
| H | 6.5 |
| O | 26.8 |
| S | 2.5 |
| N | 0.1 |
| Ash analysis (mg/kg dry solid) | |
| Cl | 0.01-0.1 ppm |
| Na | 1-50 ppm |
| K | 1-30 ppm |
| Molecular weight (Mw) | 100-1000 Da |

| Properties of Lignoboost | |
|---|---|
| Parameters | Characteristics (Values) |
| Lignin, alkali | BioChoice ™ CAS number 8068-05-1 from Domtar |
| Physical state | Solid |
| Color | Yellow-brown |
| pH | 3-7 |
| Solubility | Not soluble under acidic and neutral conditions. Soluble under alkaline conditions. Soluble in DMSO and partly soluble in acetone and methanol. |
| Content in fuel (mass-%) | |
| Moisture* | 32.3 |
| Ash (dry) | 0.5-3% |
| Heat Value (MJ/Kg) | |
| HHV | 25.0-27.0 |
| Elemental analysis (% dry ash free) | |
| C | 65.1 |
| H | 5.8 |
| O | 26.1 |
| S | 2.5 |
| N | 0.1 |
| Ash analysis (mg/kg dry solid) | |
| Cl | 0.01 |
| Na | 1666 |
| K | 543 |
| Molecular weight (Mw) | 4000-5000 Da |

*Data from filtered lignin. Other data are based on both filtered and dried lignin.

| Properties of Lignosulfonate lignin | |
|---|---|
| Parameters | Characteristics (values) |
| Sodium lignosulfonate | Obtained from Domsjö: Domsjö Lignin DS-10; CAS Number 8061-51-6/8062-15-5 |
| Physical state | Solid |
| Color | Dark brown |
| pH | 7-9 |
| Solubility | *Contains both hydrophilic and hydrophobic groups. Water solubility: 600 g/l at 20° C. |
| Moisture | 5-6% |
| Elemental analysis (% dry ash free) | |
| C | 45-65 |
| H | 4-7 |
| O | 20-35 |
| S | 5-8 |
| N | 0.2 |
| Ash analysis (mg/kg dry solid-%) | 10-24 |
| Phenolic group content | 2% |
| HHV (MJ/Kg) | 17.0-23.0 |
| Molecular weight (Mw) | 10.000-50.000 Da |

*The co-existence of the hydrophilic sulphite groups and hydrophobic aromatic structures provide lignosulphonates with unique amphiphilic properties (Reference: Dimitri Areskogh. Structural Modifications of Lignosulphonates. Doctoral Thesis, KTH, 2011).

| Properties of Hydrolysis lignin | |
|---|---|
| Parameters | Characteristics (values) |
| Hydrolysis lignin | Hydrolysis lignin from an ethanol process; CAS Number 8061-51-6/8062-15-5 |
| Physical state | Solid |
| Color | Light brown |
| pH | 3-7 |
| Solubility | * |
| Moisture | 4-9% |
| Elemental analysis (% dry ash free) | |
| C | 55-60 |
| H | 5-6 |
| O | 30-35 |
| S | 0.1-1% |
| N | 0.5-2.4% |
| Carbohydrates | 10-23% |
| Ash analysis (mg/kg dry solid-%) | 1-3% |
| HHV (MJ/Kg) | |
| Molecular weight (Mw) | 5.000-10.000 Da |

*Hydrolysis lignin has many condensed structures, produced by dehydration reactions between the benzylic carbon atoms and the reactive sites of the aromatic ring. As a consequence, these structures have poor reactivity and high water retention.

4. Preparation of Starch/Lignin Blend 1. 120 g cationic potato starch (DS 0.06) was added to 1 liter water at room temperature. The starch was heated and cooked during stirring until full gelatinization was achieved, approximately 15 minutes. The cooked starch was cooled to room temperature and the concentration was adjusted with water to give a starch solution with a starch concentration of 1.0 wt-%, where the concentration was measured as the amount of mass after drying a certain volume in a heating cabinet.
2. 100 ml of the starch solution was poured to a glass beaker and 1 g of lignin oil obtained as described above or of hydrolysis lignin, lignoboost or lignosulfonate lignin was added to the starch. The resulting blend containing lignin oil had a white/grey shade, whereas the blends containing hydrolysis lignin, lignoboost or lignosulfonate lignin had a brown color.
3. The starch/lignin blend was heated and kept at 90-95° C. for 10 minutes during stirring.
4. The starch/lignin blend was treated with ultrasonic waves in a water bath for 10 minutes. The resulting blend had containing lignin oil a white/grey shade.
5. Steps 4 and 5 were repeated until the blend got a brownish shade, most often the steps needed to be repeated twice. The starch/lignin blends containing hydrolysis lignin, lignoboost or lignosulfonate lignin, were heated and stirred in the same way.
6. The starch/lignin blend was filtrated on a course screen to remove particles >0.5 mm, in order to minimize the risk for stop in the nozzle during sheet making in the dynamic sheet former.
7. The starch/lignin blend was allowed to sediment in the glass beaker for 12-24 h.
8. ⅔ of the starch/lignin blend was carefully decanted to a new beaker. The remaining ⅓ was rejected.
9. The thus obtained starch/lignin blend decantate in the new beaker was the sizing boost additive tested as described below.
10. The dry content in the sizing boost additive was 1.2-1.6%, where 1% was the starch, and the other 0.2-0.6% was regarded as lignin. However, the amount of lignin added in step 2 was used to determine the amount of sizing boost additive to be added to the pulp in the sheet making procedure described below.

5. FT-IR Spectroscopy of Lignin-Blend Systems

FTRI analysis was performed for both lignin/starch blends (sizing boost additive) and the lignins as such, i.e. lignin oil, hydrolysis lignin, lignoboost and lignosulfonate lignin).

5.1 ATR-FTIR Measurement Procedure

Attenuated Total Reflectance-Fourier Transform Infrared (ATR-FTIR) spectra were recorded using Thermo Scientific Nicolet iS50 FT-IR spectrometer. Samples were measured in ATR mode directly after pressing the samples on the diamond crystal of iS50 ATR module (45° incidence angle). For each measurement, 32 scans with a 4 $cm^{-1}$ resolution were acquired before Fourier transformation. The IR absorbance values at 3350, 1700 and 1605 $cm^{-1}$ were extracted from the spectra after ATR correction. Specifically, the intensity measurements were performed on the ATR corrected spectra by recording the height of the absorbance bands from the baseline.

5.2 Background

The chemical composition of every type of technical lignin depends on the procedure of its isolation during the pulping process [Ref.: Y. Matsushita, J. Wood Sci., 2015, 61, 230-250]. For this reason, the major commercial lignins, such as lignoboost, lignosulphonate, and hydrolysis lignin, are distinct from each other in their chemical nature. The low-molecular weight lignin oil obtained as described above has not been subjected to any traditional isolation process and, thereby, it exhibits even more distinct chemical characteristics (as compared to technical lignins). In this context, lignoboost, hydrolysis, lignosulfonate lignin as well as the lignin oil were all comparatively evaluated by FTIR spectroscopy in blends with starch and individually.

Esterification of starch hydroxyl groups of is a well-known strategy for imparting water resistance to the resulting product [Ref.: Y.-S. Jeon et al., Starch/Starke, 1999, 51, 90-93]. The length of alkyl residues of the formed ester groups and the degree of hydroxyls substitution are known to be the main factors determining the hydrophobic character of the material [Ref.: Y.-S. Jeon et al., Starch/Starke, 1999, 51, 90-93]. According to this logic, both the hydrophobic characteristics of lignin and the degree of substitution of hydrophilic hydroxyl cover of the starch surface should ultimately determine the extent of the hydrophobicity of the resulting blend.

The extent of chemical interactions occurring on the starch/lignin oil interface, in turn, is determined by the content and the nature of functional groups present in the oil. In this respect, oxygen-containing functional groups of lignin oil are of particular importance. They are abundant and exist in many forms, such as acids, esters, ketones, aldehydes [Ref.: C. Lievens et al., Fuel, 2011, 90, 3417-3423]. Also, they are the most reactive species present [Ref.: C. Lievens et al., Fuel, 2011, 90, 3417-3423]. The facts mentioned above make FTIR spectroscopy one of the most useful techniques for characterization of lignin/starch blends. FTIR gives a lot of detailed information, like fingerprints, about the various oxygen-containing functionalities present in the lignin-oil, about their local chemical environment, and even about the types of chemical interactions they are involved in (hydrogen-bonding, etc.) [Ref.: L. J. Bellamy, The infrared spectra of complex molecules, 2nd Edition, Chapman and Hall, New York, 1980].

5.3 FTIR Analysis of Pure Technical Lignins and the Lignin Oil

Regarding chemical reactivity, the most important type of oxygen-containing functional group in lignin oil is the carbonyl group, C=O. The different kinds of carbonyls show a broad absorption band in the 1490-1850 $cm^{-1}$ range of FTIR spectrum. The spectral range of 1690-1710 $cm^{-1}$ is of highest interest as it is sensitive to the presence of the most reactive carbonyls groups—ketones, aldehydes, and carboxylic acids all absorb in this spectral range [Ref.: L. J. Bellamy, The infrared spectra of complex molecules, 2nd Edition, Chapman and Hall, New York, 1980]. The values of IR absorbance height at 1700 $cm^{-1}$ were extracted from each spectrum after ATR correction and then used to evaluate the relative content of reactive carbonyl groups in the sample.

To correctly compare the relative amount of carbonyls in different samples, we normalized the height of band at 1700 $cm^{-1}$ to the height of the band at 1605 $cm^{-1}$. The band at 1605 $cm^{-1}$ is due to the aromatic ring C=C stretching vibrations [Ref.: L. J. Bellamy, The infrared spectra of complex molecules, 2nd Edition, Chapman and Hall, New York, 1980]. Aromatic C=C bonds are abundant in the technical lignins and the lignin oil, and their IR absorbance lies in a very characteristic spectral region. Also, aromatic C=C bonds are the least reactive type of chemical bonds present in the lignins. The amount of aromatic C=C bonds varies very little in every technical lignin and lignin oil as well; it is almost independent of the isolation procedure. All this makes IR absorption band at 1605 $cm^{-1}$ a perfect reference absorption band to be used as a normalization point for estimation of relative carbonyl content in the sample.

The ratio of heights of bands at 1700 and 1605 $cm^{-1}$ was used to express the amount of reactive carbonyl groups in the sample relatively to the amount of inert aromatic C=C bonds.

| IR ratio of the absorbance 1700/1605 $cm^{-1}$ for Lignin oil, hydrolysis lignin (HL), lignoboost (LB) and lignosulfonate (LS) lignin | |
|---|---|
| Lignin oil | 2.35 |
| Hydrolysis lignin | 1.02 |
| Lignoboost | 0.64 |
| Lignosulfonate | 0.32 |

The striking difference between the measured samples is that The lignin oil has more than two times higher value for the ratio of absorbance 1700/1605 $cm^{-1}$ than the rest of the samples. The lignin oil value of 2.35 indicate that, relatively to the IR absorptions of the aromatic building blocks of lignin, the sample contains 2.3 times higher concentration of carbonyls than hydrolysis lignin, 3.7 times greater than lignoboost, and 7.3 times higher than lignosulphonate. Such a high content of carbonyl groups (as compared to the technical lignins) could contribute to the increased reactivity of the lignin in the lignin oil. When mixed with starch, increased reactivity of the lignin oil, could lead to the increasing degree of substitution of hydrophilic hydroxyl cover of the starch surface (for example as a result of the esterification reaction between hydroxyl groups of starch and carboxylic groups of lignin oil) and thus to the increased hydrophobicity. Hydrophilicity of starch could also be decreased as a result of hydrogen bond forming between carbonyl groups of the lignin oil and hydroxyls of starch.

Another factor crucial for the hydrophobicity of the resulting starch/lignin blend is hydrophobic characteristics of lignin itself. The abundance of phenolic and aliphatic hydroxyl-groups was proposed to be the main reason why lignin, in general, is not hydrophobic enough for the use as a hydrophobic barrier on paper [Ref.: S. Antonsson et al., Ind. Crops Prod., 2008, 27, 98-103]. A broad and strong IR absorption band centered at 3350 cm$^{-1}$ is ascribed to the stretching vibration of phenolic and aliphatic hydroxyl groups [Ref.: L. J. Bellamy, *The infrared spectra of complex molecules*, 2nd Edition, Chapman and Hall, New York, 1980]. This IR absorption band was found to be present in all measured lignin samples. To comparatively estimate the amount of hydroxyl-groups in lignin samples we used the ratio of heights of bands at 3350 and 1605 cm$^{-1}$.

| IR ratio of the absorbance 3350/1605 cm$^{-1}$ for lignin oil, hydrolysis lignin (HL), lignoboost (LB) and lignosulfonate (LS) lignin | |
|---|---|
| Lignin oil | 0.67 |
| Hydrolysis lignin | 1.33 |
| Lignoboost | 0.83 |
| Lignosulfonate | 0.63 |

The ratio of heights of bands at 3350 and 1605 cm$^{-1}$ expressing the relative amount of phenolic and aliphatic hydroxyls to aromatic C=C double bonds was found to be low in case of the lignin oil. Lesser value has been obtained only in case of lignosulphonate lignin, which is known to contain the smallest amount of hydroxyl groups among the technical lignins. The small relative content of phenolic and aliphatic hydroxyl groups observed in the lignin oil is likely to be another factor contributing to the increased hydrophobicity of its blend with starch.

5.4 FTIR Analysis of Pure Technical Lignins in Blends with Starch

After blending lignins with starch, the ratio of heights of bands at 1700 and 1605 cm$^{-1}$ was used to monitor the change in the amount of reactive carbonyl groups in the sample relatively to the amount of inert aromatic C=C bonds.

| IR ratio of the absorbance 1700/1605 cm$^{-1}$ for lignin oil, hydrolysis lignin (HL), lignoboost (LB) and lignosulfonate (LS) lignin in pure form and in blends with starch. | | |
|---|---|---|
| IR ratio 1700/1605 cm$^{-1}$ | | Decrease in ratio |
| Blends with starch | Pure lignins | after blending, % |
| Lignin oil 0.85 | 2.35 | 63.8 |
| Hydrolysis lignin 0.94 | 1.02 | 6.9 |
| Lignoboost 0.59 | 0.64 | 7.8 |
| Lignosulfonate 0.31 | 0.32 | 3.1 |

The most dramatic decrease in the ratio of the IR absorbance 1700/1605 cm$^{-1}$ (as compared to pure samples) was observed for the lignin oil blend with starch. The decline in the ratio was found to be 63.8%. The decrease in the ratio found in other samples was much lower (hydrolysis lignin—6.9%; lignoboost—7.8%; lignosulphonate—3.1%). Such a dramatic decrease in the relative absorbance of carbonyl group after blending of the lignin oil with starch is a direct indication of their chemical interactions with starch. High chemical reactivity of the lignin oil likely leads to a higher degree of substitution of starch hydroxyl groups (as compared to the technical lignins). Correspondingly, the hydrophobicity of the resulting blend is increasing.

5.5 Conclusions

Supposedly, both the hydrophobic characteristics of lignin and the degree of substitution of hydrophilic hydroxyl cover of starch surface ultimately determine the extent of hydrophobicity of the resulting blend. It has been found that the relative IR absorbance of reactive carbonyl groups in the lignin oil sample (normalized to the IR absorbance of aromatic C=C bonds) is much higher as compared to the technical lignin samples (hydrolysis lignin, lignoboost, lignosulfonate, lignin). The high content of reactive carbonyl groups in lignin oil likely leads to the greater degree of substitution (or to hydrogen-bonding) of hydroxyl groups of starch and thus results in increased hydrophobicity. The blending of the lignin oil with starch demonstrated the dramatic decrease in the relative IR absorption of reactive carbonyl groups (as compared to technical lignins). These findings confirmed the idea of occurrence of chemical interactions between starch and lignin oil and showed that the carbonyl groups of the lignin oil are involved in this process to a much greater extent than the carbonyls of technical lignins. Not only chemical reactivity but also the hydrophobic characteristics of lignin component determine the increased hydrophobicity of lignin/starch blends. The abundance of phenolic and aliphatic hydroxyl groups is known to be the main reason why lignin, in general, is not hydrophobic enough for the use as a hydrophobic barrier on paper. It has been found that the relative IR absorbance of phenolic and aliphatic hydroxyl groups (normalized to the IR absorbance of aromatic C=C bonds) is low in case of the lignin oil, which makes it more hydrophobic (as compared to technical lignins).

Finally, it has to be said that the lignin oil seems to have a unique set of characteristics enabling improved hydrophobicity of its blends with starch: 1) it contains lower amount of phenolic and aliphatic hydroxyl groups, which makes it more hydrophobic; 2) yet it remains more reactive due to the high content of carbonyl groups (specifically, in carboxy-functionalities of conjugated aromatic acids as revealed by $^{13}$C NMR; see section 6). Higher reactivity enables higher the degree of substitution of hydroxyl groups of starch and provides increased hydrophobicity of the resulting blend.

6. Comparative $^{13}$C NMR Analysis of the Lignin Oil and Lignoboost Lignin

The $^{13}$C NMR spectra of the lignin oil and lignoboost lignin in DMSO were recorded at room temperature using a Spinsolve Carbon NMR spectrometer at 60 MHz. The measurements were conducted for 16 hours at 90° pulse angle. The number of acquired scans was about 19000.

Analysis of $^{13}$C signals of the lignin oil and lignoboost lignin samples dissolved in DMSO allowed identification of several types of functional groups in different chemical environments:

1) Carbon atoms in ortho-, para- and meta-position of the various phenolic structures exhibited signals at approximately 115, 119 and 129 ppm respectively. Expectedly, the highest amount of carbon atoms for both samples was found in this chemical shift range.
2) A signal of phenolic methoxy group was found to be present in $^{13}$C NMR spectra of both samples at 56 ppm.
3) Analysis of the aliphatic region showed that aliphatic carbon atoms are present only in the $^{13}$C NMR spectrum of the lignin oil. Specifically, methyl-aromatic carbon is present in $^{13}$C NMR spectrum of lignin oil at 20.7 ppm. The signal of ortho-alkoxy substituted methyl benzenes is distinguishable at 15.34 ppm. The absence of aliphatic carbon atoms in the spectrum of Lignoboost lignin and the presence of these signals in the lignin oil spectrum supports the idea of a more hydrophobic nature of the lignin oil.
4) The most striking difference in the $^{13}$C NMR spectra of the lignin oil sample and lignoboost lies in the range 173-178 ppm. This chemical shift range corresponds to the carbon atom of the carboxyl group of different lignin-derived unsaturated conjugated aromatic carboxylic acids (ferulic, cinnamic, syringic, vanillic, caffeic). The spectrum of the lignin oil is characterized by six signals in the range 173-178 ppm, while the Lignoboost spectrum does not show any peaks at those values of chemical shift. This observation confirmed the findings of the FTIR analysis about a high content of reactive carbonyl groups that are likely to be responsible for the unique reactivity of the lignin oil (as compared to technical lignins). Moreover, the chemical environment of carbonyls has become evident after $^{13}C$ NMR analysis. Specifically, carbonyls were found to belong to the carboxyl functional groups of conjugated aromatic acids.

Thus, two significant differences have been found in the $^{13}C$ NMR spectra of the lignin oil and Lignoboost lignin. Firstly, it was observed that, unlike Lignoboost, the lignin oil shows the presence of aliphatic carbon atoms, which is likely to be the reason for its higher hydrophobicity. Secondly, a number of signals corresponding to the carbon atom of conjugated carboxy group of aromatic carboxylic acids have been found in the spectrum of the lignin oil, but not Lignoboost. This finding is in excellent agreement with the FTIR data that show that the relative IR absorbance of reactive carbonyl groups (of carboxy functionalities) in the lignin oil sample is much higher than in the technical lignin samples. The high content of carboxy groups in lignin oil likely leads to the greater degree of substitution (or to hydrogen-bonding) of hydroxyl groups of starch and thus results in increased hydrophobicity.

7. Sheet Making Procedure
7.1 Pulp Preparation

Refined (ready to use) unbleached kraft pulp with a fibre concentration of 3-5% was diluted to a pulp suspension with 0.5% w/w fibre concentration. The conductivity of the suspension was adjusted to 1000-1400 µS/cm, and pH was adjusted to 7.2-7.4. All trials were performed with pulp suspension and all additives kept at room temperature.

7.2 Sheet Making in the Dynamic Sheetformer™
1. Pulp suspension for one sheet, aiming for 140 g/m², was added to the sheet former and stirring was started.
2. The sizing boost additive obtained above was added in amounts of 0.5-15 kg/t pulp. Stirring 30 s.
3. PAC (Poly Aluminum Chloride) was added, 1.6 kg/t pulp. The PAC product was diluted to 1% before use. Stirring 30 s.
4. Hydrophobization additive was added. Stirring 30 s. The following hydrophobation additives were used in the amounts (kg/ton pulp) indicated in the tables of FIGS. 3-6: ASA (FennoSize 1100), AKD (FennoSize KD 360M), and AKD (FennoSize KD 360M) combined with resin (FennoSize RS KN 10/35), the AKD/resin combination (ratio AKD 0.3:resin 0.7) is referred to as Gamma in FIG. 5.
5. Retention aid, C-PAM (cationic poly acrylic amid), was added in an amount of 0.2 kg/t pulp. The product was diluted to 0.1% before use. Stirring 30 s.
6. Pulp suspension was sprayed on the rotating wire.
7. When all pulp was sprayed onto the wire, dewatering was started.
8. The sheet was lifted out of the sheet former and pressed through a roll press at 3 bar.
9. The sheet was dried restrained in a heat dryer (trade name=STFI dryer).

7.3 Analysis—Cobb Measurements

The Cobb value indicates the hydrophobicity of a paper sheet, and is the calculated mass of water absorbed in a specified time by 1 m² of paper under specified conditions.
1. The dried sheets were conditioned at 23° C./50% relative humidity >12 h, according to WASO 187.
2. $Cobb_{60}$ and $Cobb_{1800}$ measurements according to ISO 535 were performed.
3. Test pieces for $Cobb_{1800}$-2d UV were placed in an illumination cabinet 24 h. Standard illumination for D65 light (described in i.e. ISO 11475) plus extra UV was used. The samples were placed 100 mm below the light tubes.
4. The $Cobb_{1800}$-2d UV samples were conditioned at 23° C./50% relative humidity >12 h, according to WASO 287.
5. Cobbnoo measurements according to ISO 536 were performed.

Figure 3:
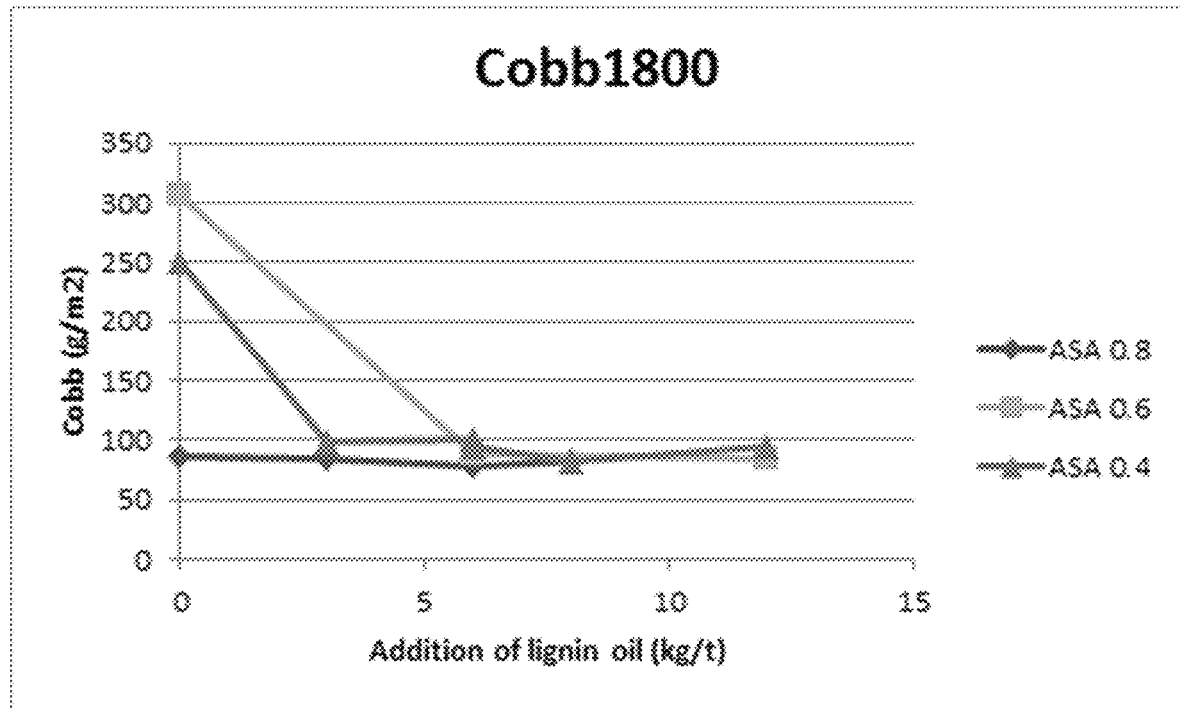
FIG. 3 shows the Cobb1800 value as a function of added lignin oil for different additions of ASA.
Figure 4:
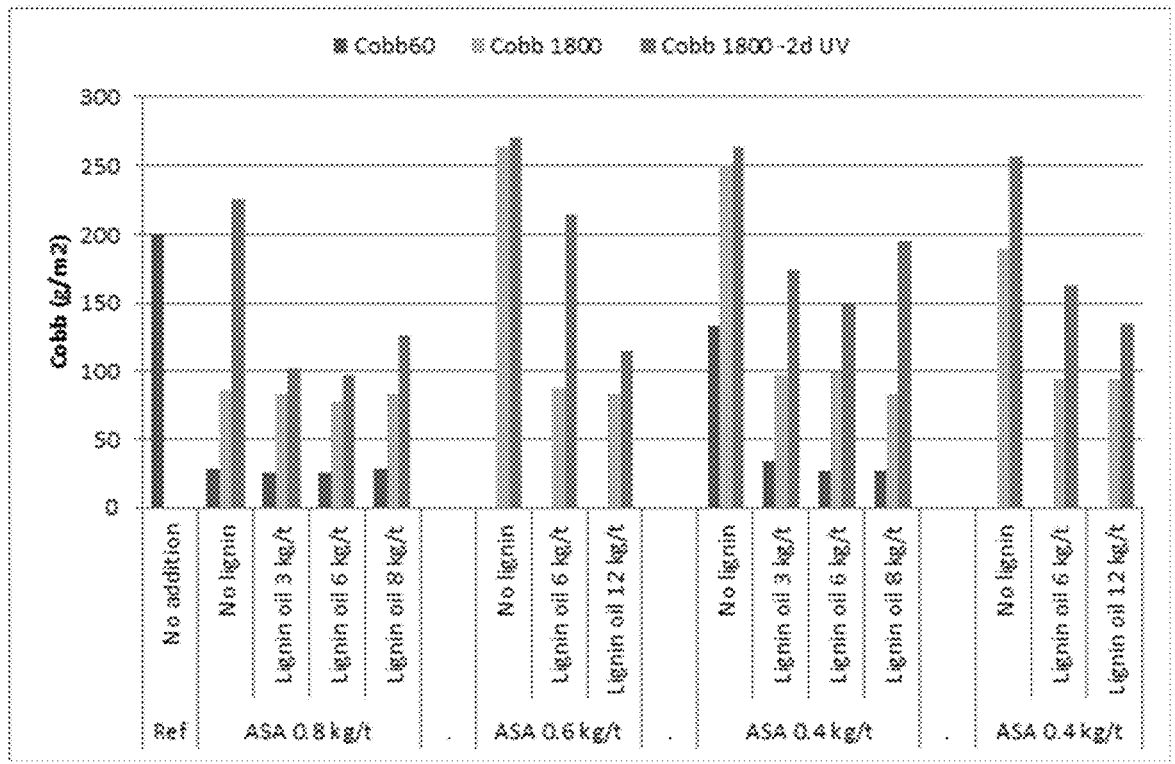
FIG. 4 shows Cobb values for different additions of lignin oil and ASA.
Figure 5:
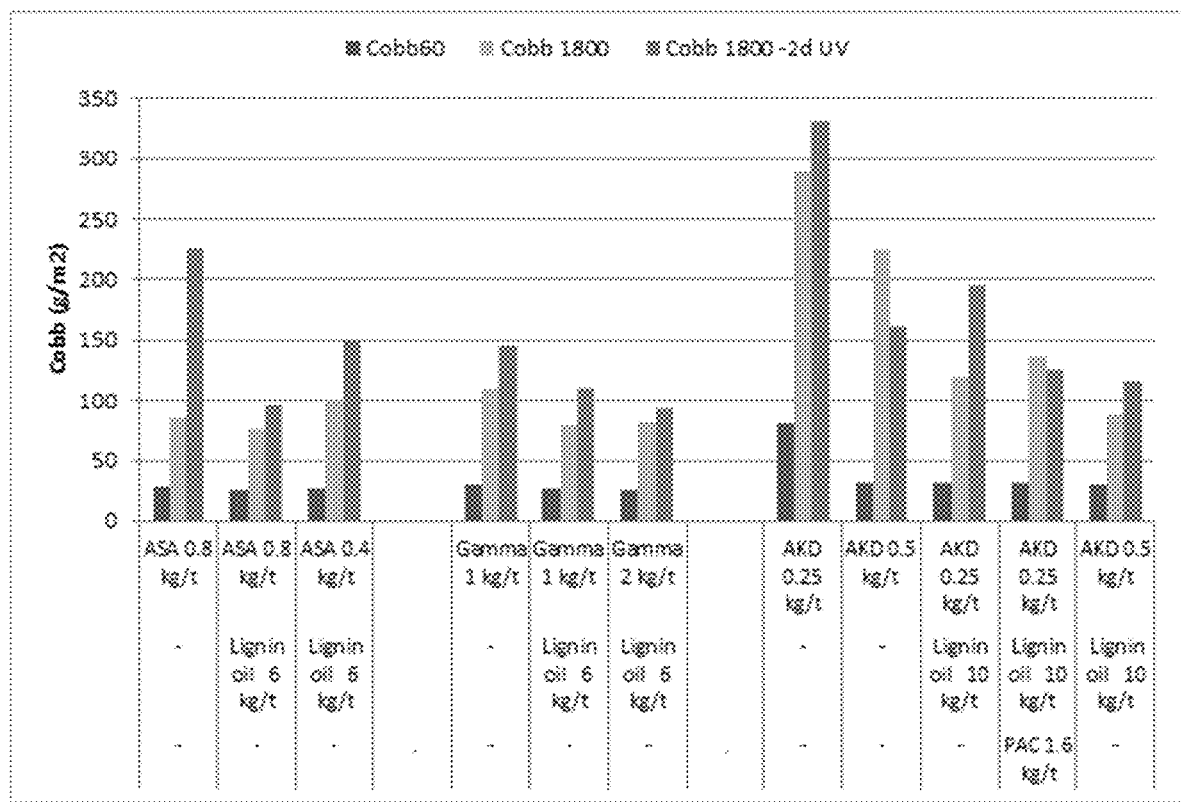
FIG. 5 shows Cobb values for additions of lignin oil in combination with different sizing additives.
Figure 6:
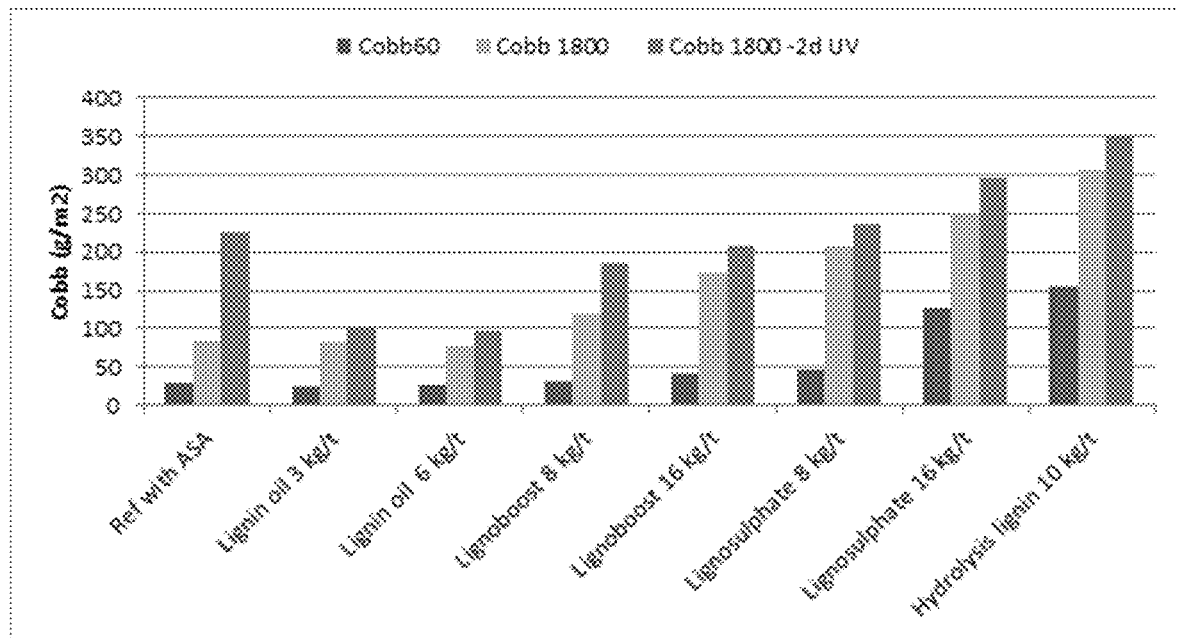
FIG. 6 shows Cobb values for ASA in combination with different lignin types.

The results are shown in FIGS. 3-6, where FIG. 3 shows the Cobb1800 value as a function of added lignin oil for different additions of ASA, FIG. 4 shows Cobb values for different additions of lignin oil and ASA, FIG. 5 shows Cobb values for additions of lignin oil in combination with different sizing additives, and FIG. 6 shows Cobb values for ASA in combination with different lignin types. The results shown in FIG. 6 are obtained with addition of ASA of 0.8 kg/ton pulp for all sheets. As shown in FIG. 3, it was found that when using the sizing boost additive based on lignin oil and starch, full sizing could be reached with only half the normal addition (0.8 kg/ton) of ASA. Using the sizing boost additive with normal addition of ASA improved size stability was also achieved after exposure to UV light. The sizing boost additive had the same effect also for other tested sizing additives, Gamma (a mix of AKD and resin) and AKD, as shown in FIG. 5. FIG. 6 shows that at an ASA addition of 0.8 kg (which corresponds to mill ASA addition of 1.1-1.3 kg/t), the hydrofobation effect maintained after two days with UV in the light cabinet when lignin oil based sizing boost additive was added. When adding commercial lignins lignoboost, lignosulpohonate or hydrolysis lignin, no positive effect was achieved. In some of the samples the hydrofobation even decreased.

The invention claimed is:

1. A method of preparing a sizing boost additive, comprising the steps of:
I) combining a lignin oil and an aqueous solution of gelatinized cationic polysaccharide, and optionally water, to obtain a lignin/polysaccharide blend, wherein the lignin oil is obtained by base catalyzed depolymerization of lignin; and wherein the gelatinized cationic polysaccharide is prepared by cooking dry cationic polysaccharide in water until completely gelatinized; and wherein the lignin oil and the cationic polysaccharide are included in the lignin/polysaccharide blend so that a weight ratio of lignin oil:polysaccharide in the blend is 1:0.5-2, where the weight of the polysaccharide is the weight of dry polysaccharide added in preparation of the aqueous solution of gelatinized cationic polysaccharide; and the combined weight of lignin and polysaccharide is 1-10 wt-% based on the total weight of the resulting blend; followed by
II) mixing the lignin/polysaccharide blend at a temperature of 40-100° C. until the blend has changed color from grey-white to brown.

2. The method of claim 1, further comprising a step of III) filtering off any particles >0.5 mm.

3. The method of claim 2, further comprising the steps of
IV) allowing the filtrate from step III) to settle; and
V) decanting and recovering the top phase.

4. The method of claim 1, wherein the lignin oil is obtained by base catalyzed depolymerization of kraft black liquor.

5. The method of claim 4, wherein the lignin oil is obtainable by a method comprising the steps of:
a) preparing a black liquor composition comprising kraft black liquor, and having a hydroxide ion concentration of 1-40 g/l based on the volume of black liquor, and if necessary, adjusting the hydroxide ion concentration by means of an addition of an acidifying agent;
b) reacting the black liquor composition in a reactor and reacting the black liquor composition at 180-240° C. for 10-120 minutes in the presence of a solid catalyst, thereby causing depolymerization of lignin in the black liquor;
c) cooling the composition to a temperature below the boiling point of a solvent to be added in a subsequent step;
d) acidifying the composition by adding one or more acidifying agents until a pH of 4-5 is reached;
e) adding a solvent to the composition, in order to extract oil from the composition;
separating the composition by phase separation in a first separation step into
a first oil phase comprising solvent, oil, and organic acids,
a first water phase comprising water, salts, and non-depolymerized lignin solids, and
a second water phase comprising water and salts;
g) filtering the first phase to remove any particles;
h) desalting the filtered oil phase by
washing it by adding water and separating by phase separation in a second separation step into
a second oil phase comprising oil and solvent,
a third water phase comprising salts; or
adding adsorbent and/or absorbent material or ion exchange material, or combinations thereof,
i) evaporating the solvent comprised in the second oil phase, thus obtaining the lignin oil.

6. The method of claim 1, wherein the aqueous solution of gelatinized cationic polysaccharide is obtained by cooking dry cationic starch in water until completely gelatinized, and adjusting the concentration to 0.5-23 wt.

7. The method of claim 1, wherein the gelatinized polysaccharide is allowed to cool to room temperature before combining it with lignin oil in step I.

8. A sizing boost additive, obtainable by the method of claim 1.

9. The method of claim 1, further comprising the steps of
III) allowing the brown blend from step II) to settle; and
IV) decanting and recovering the top phase.

10. A method of producing hydrophobic paper, comprising the step of adding a sizing boost additive obtainable by the method of claim 1, and a hydrophobization agent, to a lignocellulosic pulp suspension at the wet end of a paper manufacturing process.

11. The method of claim 10, wherein the sizing boost additive is added in an amount corresponding to 0.5-12 kg lignin oil per ton pulp, where the amount of lignin oil refers to the weight of lignin oil added in step I of the method of preparing the sizing boost additive.

12. The method of claim 10, wherein the hydrophobization agent is chosen from ASA, AKD, or AKD combined with resin.

13. The method of claim 10, wherein PAC or Alum, and retention aids are added to the pulp suspension.

14. The method of claim 10, wherein pH of the pulp suspension is adjusted to 6-8.5.

15. The method of claim 10, wherein the conductivity of the pulp suspension is adjusted to 0-8000 µS/cm.

16. The method of claim 10, wherein the cellulose pulp is kraft pulp.

17. A hydrophobic paper obtainable by the method of claim 10.

* * * * *